(12) United States Patent
Huang et al.

(10) Patent No.: US 8,270,471 B2
(45) Date of Patent: Sep. 18, 2012

(54) ENCODERS AND SCHEDULING METHODS FOR MACROBLOCK-BASED ADAPTIVE FRAME/FILED CODING

(75) Inventors: Yu-Wen Huang, Taipei (TW); Chih-Hui Kuo, Hsinchu (TW)

(73) Assignee: Mediatek, Inc., Hsinchu (TW)

( * ) Notice: Subject to any disclaimer, the term of this patent is extended or adjusted under 35 U.S.C. 154(b) by 1347 days.

(21) Appl. No.: 11/937,018

(22) Filed: Nov. 8, 2007

(65) Prior Publication Data

US 2009/0122869 A1 May 14, 2009

(51) Int. Cl.
*H04N 7/12* (2006.01)
(52) U.S. Cl. .......... 375/240.02; 375/240.12; 375/240.24
(58) Field of Classification Search .............. 375/240.01, 375/240.02, 240.12, 240.24
See application file for complete search history.

(56) References Cited

U.S. PATENT DOCUMENTS

| | | | | |
|---|---|---|---|---|
| 6,980,596 B2* | 12/2005 | Wang et al. | ............... | 375/240.16 |
| 7,480,335 B2* | 1/2009 | Payson | ..................... | 375/240.25 |
| 2003/0099292 A1* | 5/2003 | Wang et al. | ............... | 375/240.12 |
| 2005/0169374 A1* | 8/2005 | Marpe et al. | ............. | 375/240.16 |
| 2006/0050786 A1* | 3/2006 | Tanizawa et al. | ........ | 375/240.03 |
| 2006/0222251 A1* | 10/2006 | Zhang | ........................... | 382/239 |
| 2008/0043845 A1* | 2/2008 | Nakaishi | ................... | 375/240.16 |
| 2008/0079743 A1* | 4/2008 | Watanabe | ..................... | 345/537 |
| 2008/0273595 A1* | 11/2008 | Huang et al. | ............. | 375/240.12 |

OTHER PUBLICATIONS

Chen et al,"Analysis and Architecture Design of an HDTV720p 30 Frames/s H.264/AVC Encoder", IEEE Transactions of Circuits and Systems for Video Technology, vol. 16, No. 6, Jun. 2006, pp. 673-688 (16 pages).

* cited by examiner

*Primary Examiner* — Bob Phunkulh
*Assistant Examiner* — Jenkey Van
(74) *Attorney, Agent, or Firm* — Grossman, Tucker, Perreault & Pfleger, PLLC

(57) ABSTRACT

Encoders and scheduling methods for macroblock-based adaptive frame/filed (MBAFF) coding are provided. The encoder comprises a first processing engine and a second processing engine. The first processing engine executes a first encoding stage of the frame coding and field coding processes. The second processing engine obtains a processed macroblock (MB) pair or a processed frame and field of a MB pair from the first processing engine, and executes a second encoding stage of the frame coding and field coding processes on the obtained MB pair or obtained frame and field while the first processing engine executes the first encoding stage of the frame coding and field coding processes on a subsequent MB pair or subsequent frame and field.

7 Claims, 5 Drawing Sheets

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |

FIG. 1 (Prior Art)

ENCODERS AND SCHEDULING METHODS FOR MACROBLOCK-BASED ADAPTIVE FRAME/FILED CODING

CROSS-REFERENCES TO RELATED APPLICATIONS

Not applicable.

BACKGROUND OF THE INVENTION

1. Field of the Invention

The present invention relates to encoders and scheduling methods for macroblock-based adaptive frame/filed (MBAFF) coding; and more particularly, the present invention relates to encoders and scheduling methods of pipeline processing macroblocks or macroblock pairs for MBAFF coding.

2. Descriptions of the Related Art

Since multimedia applications in the future have to support highly interaction and rapid transmission, multimedia storage formats with higher compression ratio and higher quality of contents are demanded. MPEG-2, MPEG-4, H.263, and H.264/AVC formats are some of the examples. Among the formats, H.264/AVC format undoubtedly plays an important role in the future trend.

On-going applications range from High Definition Digital Video Disc (HDDVD) or BluRay for home entertainments with large screens to Digital Video Broadcasting for Handheld terminals (DVB-H) with small screens. However, the H.264/AVC coding performance comes at the price of computational complexity. According to the instruction profiling with HDTV specification, H.264/AVC encoding process requires 3600 Giga-instructions per second (GIPS) computation and 5570 Giga-bytes per second (GBytes/s) memory access. For real-time applications, the acceleration by a dedicated hardware is a must.

However, it is difficult to design the architecture for the H.264/AVC hardwired encoder and its modules. Besides high computational complexity and memory access, there are many sequential procedures for encoding a macroblock (Mb), these procedures may include intra and inter predictions, block/macroblock/frame-level reconstruction loops, entropy coding, and in-loop deblocking filter.

FIG. 1 illustrates a picture composed of a plurality of Mbs 0, 1, 2, 3, . . . , 47, and the number marked on the MBs indicates the sequential order of encoding. Macroblock-based adaptive frame/filed (MBAFF) coding can be adopted in H.264/AVC or future standards to improve the coding efficiency. The coding unit for MBAFF coding is a macroblock pair (MbPair), each MbPair comprises two Mbs, such as Mbs 0, 8 or Mbs 1, 9. The encoder encodes one MbPair twice, first by frame coding and then by field coding, or vice versa. With MBAFF coding, each Mb of the picture requires two-pass coding path, so that the computational complexity is twice as the normal coding.

SUMMARY OF THE INVENTION

An embodiment of the scheduling methods for macroblock-based adaptive frame/field (MBAFF) coding comprises the steps of: processing a top frame and top field of a first macroblock pair in a first encoding stage of the frame coding process and field coding process respectively; processing a bottom frame and bottom field of the first macroblock pair in the first encoding stage of the frame coding process and field coding process respectively while processing the top frame and top field of the first macroblock pair in a second encoding stage of the frame coding process and field coding process respectively; and determining an MBAFF coding decision for the first macroblock pair based on a result derived by at least one of the encoding stages of the frame coding and field coding processes.

Another embodiment of the scheduling methods for MBAFF coding comprises the steps of: processing a first macroblock pair in a first encoding stage of the frame coding and field coding processes; processing a second macroblock pair in the first encoding stage of the frame coding and field coding processes while processing the first macroblock pair in a second encoding stage of the frame coding and field coding processes; and determining an MBAFF coding decision for the first macroblock pair based on a result derived by the encoding stages of the frame coding and field coding processes.

An embodiment of the encoder for MBAFF coding comprises a first set of processing engines and a second set of processing engines. The first set of processing engines comprises a first processing engine and a second processing engine. The first processing engine of the first set executes a first encoding stage of the frame coding process. The second processing engine of the first set obtains a processed macroblock (MB) pair or a processed frame of a MB pair from the first processing engine, and executes a second encoding stage of the frame coding process on the obtained MB pair or frame while the first processing engine executes the first encoding stage of the frame coding process on a subsequent MB pair or frame. The second set of processing engines also comprises a first processing engine and a second processing engine. The first processing engine of the second set executes one of the encoding stages of the field coding process on the MB pair or a field of the MB pair in parallel with the corresponding encoding stage executed by one processing engine of the first set of processing engines. And the second processing engine of the second set obtains a processed MB pair or field from the first processing engine of the second set, and executes a second encoding stage of the field coding process on the obtained MB pair or field while the first processing engine of the second set executes the first encoding stage of the field coding process on a subsequent MB pair or field.

Another embodiment of the encoders for MBAFF coding comprises a first processing engine and a second processing engine. The first processing engine executes a first encoding stage of the frame coding and field coding processes. The second processing engine obtains a processed macroblock (MB) pair or a processed frame and field of a MB pair from the first processing engine, and executes a second encoding stage of the frame coding and field coding processes on the obtained MB pair or obtained frame and field while the first processing engine executes the first encoding stage of the frame coding and field coding processes on a subsequent MB pair or subsequent frame and field.

According to embodiments of this invention, MBAFF coding can be executed by pipelining. The processing speed of the MBAFF coding can be improved while maintaining the video quality.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1 is a diagram illustrating an exemplary picture of video;

DESCRIPTION OF THE PREFERRED EMBODIMENT

Figure 2:
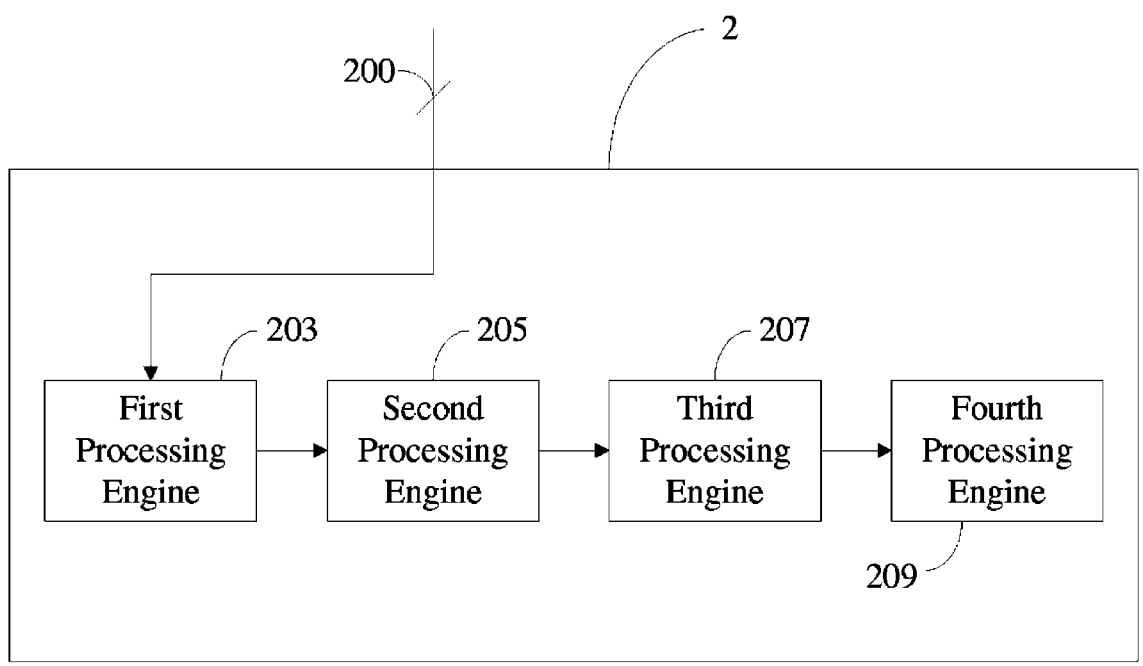
FIG. 2 is a block diagram illustrating an MBAFF encoder of a first embodiment.

As shown in FIG. 2, a first embodiment of the present invention is an MBAFF encoder 2 with one set of processing engines. The MBAFF encoder 2 can be an encoder compatible to one or many of the video coding formats, such as MPEG-4, H.264/AVC, and SVC. In the first embodiment, the MBAFF encoder 2 is used to encode video into the H.264/AVC format. The MBAFF encoder 2 comprises a first processing engine 203, a second processing engine 205, a third processing engine 207, and a fourth processing engine 209. In this embodiment, the first processing engine 203 operates integer motion estimation (IME), the second processing engine 205 operates fractional motion estimation (FME), the third processing engine 207 operates intra prediction and reconstruction (IP/REC), and the fourth processing engine 209 operates entropy coding and deblocking (EC/DB).

A picture of video 200 is divided into a plurality of macroblocks (Mbs), and these MBs form a plurality of MB pairs (MbPairs) by pairing every top MB in an even row with its neighboring bottom MB in an odd row. Each processing engine of the MBAFF encoder 2 of this embodiment is capable of executing an encoding stage of frame coding and field coding processes, and the four processing engines operate in a pipeline manner. An MBAFF coding decision for each MbPair can be derived by encoding the MbPair with both the frame and field coding processes. A preprocessing task can be executed before the encoding stages of the frame coding and field coding processes to determine the MBAFF coding decision in advance. Consequently, the processing engines may only execute the encoding stages of the selected coding process by skipping the encoding stages of the other coding process.

When conducting the frame coding process, each MbPair is divided into a top frame and a bottom frame, and when conducting the field coding process, each MBPair is divided into a top field and a bottom field. For frame coding, the top MB of each MB pair is a top frame and the bottom MB is a bottom frame, whereas for field coding, the even rows of the MB pair form a top field and the odd rows form a bottom field. The first processing engine 203 processes the top frame and top field of MBPair_1 (IME) in the first cycle. The second processing engine 205 processes the top frame and top field of MBPair_1 (FME) while the first processing engine 203 processes the bottom frame and bottom field of MBPair_1 (IME) in the second cycle. In the third cycle, the third processing engine 207 processes the top frame and top field of MBPair_1 (IP/REC), the second processing engine 205 processes the bottom frame and bottom field of MBPair_1 (FME), and the first processing engine 203 process the top frame and top field of MBPair_2 (IME). In the fourth cycle, the fourth processing engine 209 processes the top frame and top field of MBPair_1 (EC/DB), the third processing engine 207 processes the bottom frame and bottom field of MBPair_1 (IP/REC), the second processing engine 205 processes the top frame and top field of MBPair_2 (FME), and the first processing engine 203 process the bottom frame and bottom field of MBPair_2 (IME). The first processing engine 203 sequentially processes top frame and top field then bottom frame and bottom field of each MBPair until the last MBPair of the picture. The processing engine of an earlier encoding stage passes the processed top/bottom frame and top/bottom field to its subsequent encoding stage at the end of each cycle.

In some embodiments, the processing engines of the encoder execute the field coding process first followed by the frame coding process, and in some other embodiments, the frame coding process is executed before the field coding process.

Figure 3:
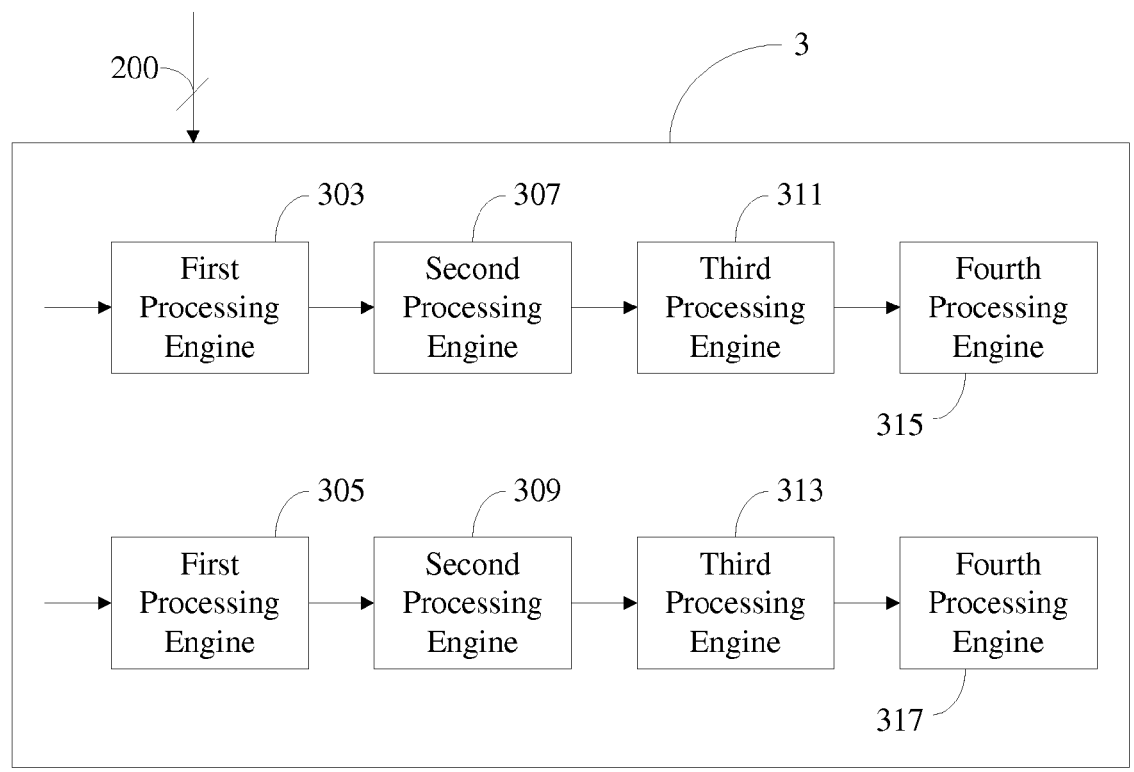
FIG. 3 is a block diagram illustrating an MBAFF encoder of a second embodiment.

As shown in FIG. 3, a second embodiment of the present invention is another MBAFF encoder 3 with two sets of processing engines. The MBAFF encoder 3 of the second embodiment is capable of performing frame coding and field coding processes in parallel to encode video into the H.264/AVC format. Similar to the MBAFF encoder 2 of FIG. 2, the MBAFF encoder 3 of this embodiment segregates each of the frame and field coding processes into four encoding stages performed by four processing engines respectively. The MBAFF encoder 3 comprises two first processing engines 303, 305 executing IME, two second processing engines 307, 309 executing FME, two third processing engines 311, 313 executing IP/REC, and two fourth processing engines 315, 317 executing EC/DB.

When video 200 inputs into the MBAFF encoder 3, one picture of the video 200 is divided as a plurality of Mbs and every two MBs form an MB pair. The first set of processing engines 303, 307, 311, and 315 conducts the frame coding process, and the second set of processing engines 305, 309, 313, and 317 conducts the field coding process. The first processing engine 303 of the first set of processing engines processes the top frame of a first Mb while the first processing engine 305 of the second set of processing engines processes the top field of the first MB. The two sets of processing engines process the frame and field coding processes in a pipelining manner similar to the embodiment of FIG. 2, and details of the pipeline scheduling method is therefore omitted here. Compared to the first embodiment of FIG. 2, the parallel architecture of the second embodiment reduces half of the processing cycles required for processing a picture, hence double the processing capability (i.e. throughput); however, the tradeoff is the cost for an additional set of the processing engines.

In some other embodiments, the MBAFF encoder contains two sets of processing engines operating in parallel, the first set is the same as the first set of processing engines 303, 307, 311, and 315 as shown in FIG. 3, the second set includes less than four processing engines. For example, the second set only includes a first processing engine for executing an encoding stage of the field coding process, for example, FME, in parallel with the corresponding encoding stage (e.g. FME) of the frame coding process executed by the second processing engine of the first set. The remaining encoding stages of the field coding process as well as all the encoding stages of the frame coding process are executed by the first set of processing engines in a similar way as described in the first embodiment. It is preferred to choose the encoding stage(s) of frame and field coding with the highest complexity to be executed in parallel.

The MB based pipeline scheduling method for MBAFF coding algorithm increases the encoding efficiency by eliminating or reducing the idle period for each encoding stage. Some embodiments of scheduling method only allow some encoding stages to be idle at the beginning or end of a picture. If a preprocessing task for making an MBAFF coding decision is executed before the first encoding stage (e.g. IME), the pipeline scheduling method can still operate normally without idle stages, for example, if an MB pair is decided to be encoded by frame coding by the MBAFF coding decision, all encoding stages of the field coding process can be skipped.

A third embodiment of the present invention is an MBAFF encoder with MB pair based pipelining architecture, and it may be implemented by the same hardware architecture as the first embodiment as shown in FIG. 2. The MBAFF encoder 2 of the first embodiment processes a top/bottom frame and a top/bottom field of an MB pair in each encoding stage at a cycle, and then the processed frame and field are passed to the subsequent encoding stage. In the third embodiment, the MBAFF encoder processes an MB pair in each encoding stage at a cycle. For example, please refer to FIGS. 1 and 2, at a fourth cycle of encoding the picture composed of MB0-MB47 as shown in FIG. 1 by MBAFF coding, the first processing engine 203 processes MbPair of MB3 and MB11, the second processing engine 205 processes MbPair of MB2 and MB10, the third processing engine 207 processes MbPair of MB1 and MB9, and the fourth processing engine 209 processes MbPair of MB0 and MB8.

When a picture of the video is received by the MBAFF encoder, the processing engines execute frame coding and field coding processes for each MB pair by pipelining. A processing engine may processes an MB pair by frame coding then field coding, or a reverse order of executing field coding before frame coding is also applicable. A fourth embodiment of the MBAFF encoder also has an MB pair pipelining architecture, which executes frame coding and field coding in parallel, and FIG. 3 shows an exemplary architecture for this type of MBAFF encoder. Please note that it is not necessary to occupy two processing engines for each encoding stage of frame and field coding, the MBAFF encoder may execute certain encoding stages of frame coding in parallel with field coding, and execute other encoding stages of frame coding and field coding in sequence. Detail descriptions of executing frame and field coding processes in parallel by two sets of processing engines are omitted for brevity.

An advantage of such MB pair pipelining schedule methods is the data reusability for IME since some data may be reused between top and bottom frames or top and bottom fields. Data reuse brings significant DRAM bandwidth reduction as well as greater processing capability compared to MB based pipelining schedule methods. Some embodiments of the MBAFF encoder with MB pair pipelining may execute a preprocessing or postprocessing task at any encoding stage to determine the MBAFF coding decision in advance, and certain encoding stages can thus be skipped.

In the present invention, encoders of some embodiments are designed to perform MBAFF coding with MB based pipelining, such as the first and second embodiments, and encoders of some other embodiments are designed to perform MBAFF coding with MB pair based pipelining such as the third and fourth embodiments. In some other embodiments, the encoders are designed to be capable of performing MBAFF coding with MB and MB pair based pipelining. The encoder for MBAFF coding claimed in the invention covers the above described encoders performing MBAFF coding with MB based pipelining, MB pair pipelining, and both MB and MB pair pipelining.

Figure 4:
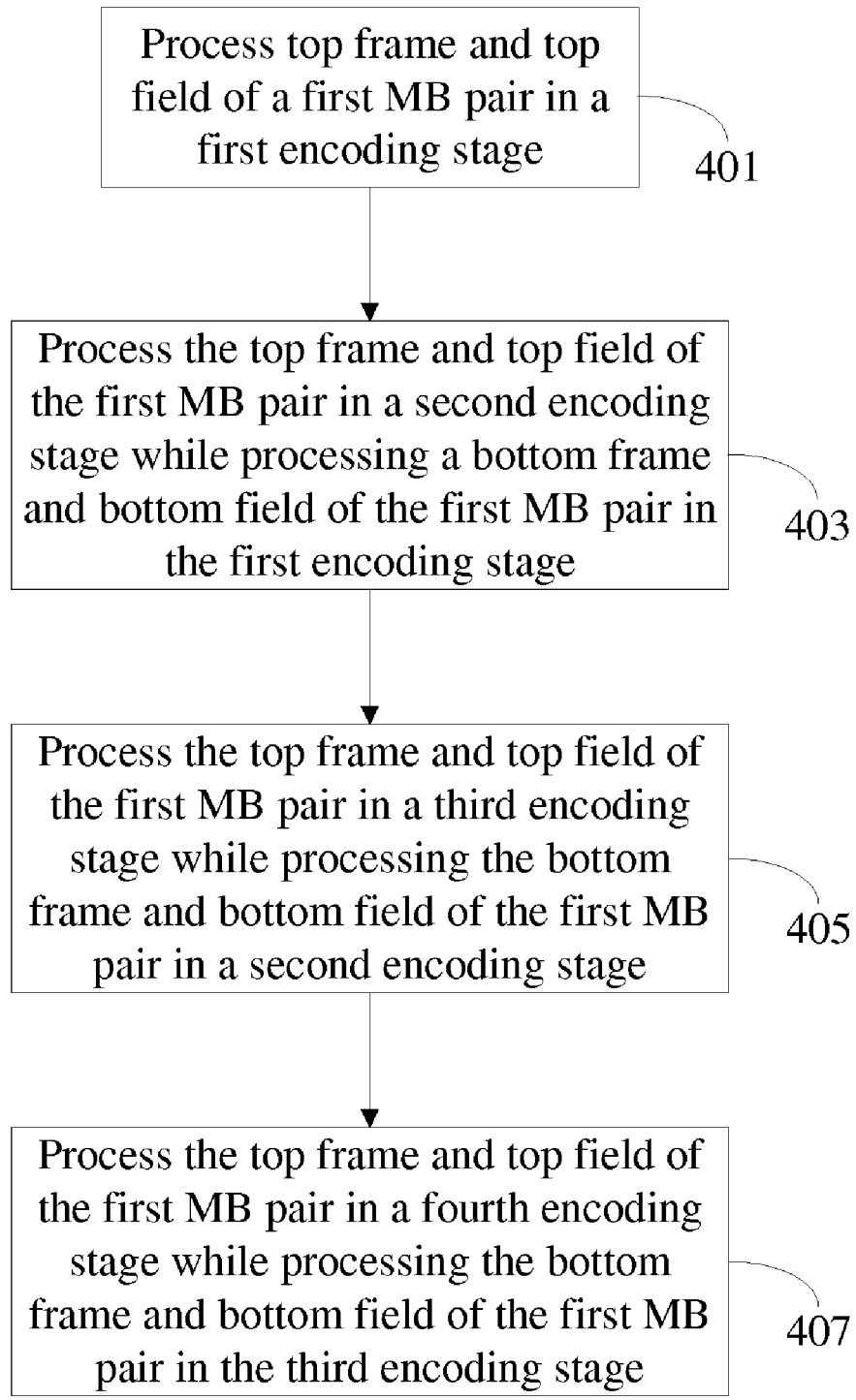
FIG. 4 is a flow chart illustrating a scheduling method for MBAFF coding.

FIG. 4 is a flow chart illustrating an MB based pipeline scheduling method for MBAFF coding. In step 401, processing top frame and top field of a first MB pair in a first encoding stage, and in step 403, processing the top frame and top field of the first MB pair in a second encoding stage while processing a bottom frame and bottom field of the first MB pair in the first encoding stage. In step 405, processing the top frame and top field of the first MB pair in a third encoding stage while processing the bottom frame and bottom field of the first MB pair in a second encoding stage. In step 407, processing the top frame and top field of the first MB pair in a fourth encoding stage while processing the bottom frame and bottom field of the first MB pair in the third encoding stage. In an embodiment, the first encoding stage includes integer motion estimation (IME), the second encoding stage includes fractional motion estimation (FME), the third encoding stage includes intra prediction (IP) and reconstruction (DCT/Q/IQ/IDCT/REC), and the fourth encoding stage includes entropy coding and deblocking (EC/DB). In some embodiments of the MB based pipeline scheduling method, steps 401, 403, 405, and 407 are performed by one set of processing engines, thus frame coding and field coding processes are executed one by one at each encoding stage, whereas in some other embodiments, these steps are performed by two sets of processing engines, thus at least one encoding stage of the frame coding process is executed concurrently with the corresponding encoding stage of the field coding process.

Figure 5:
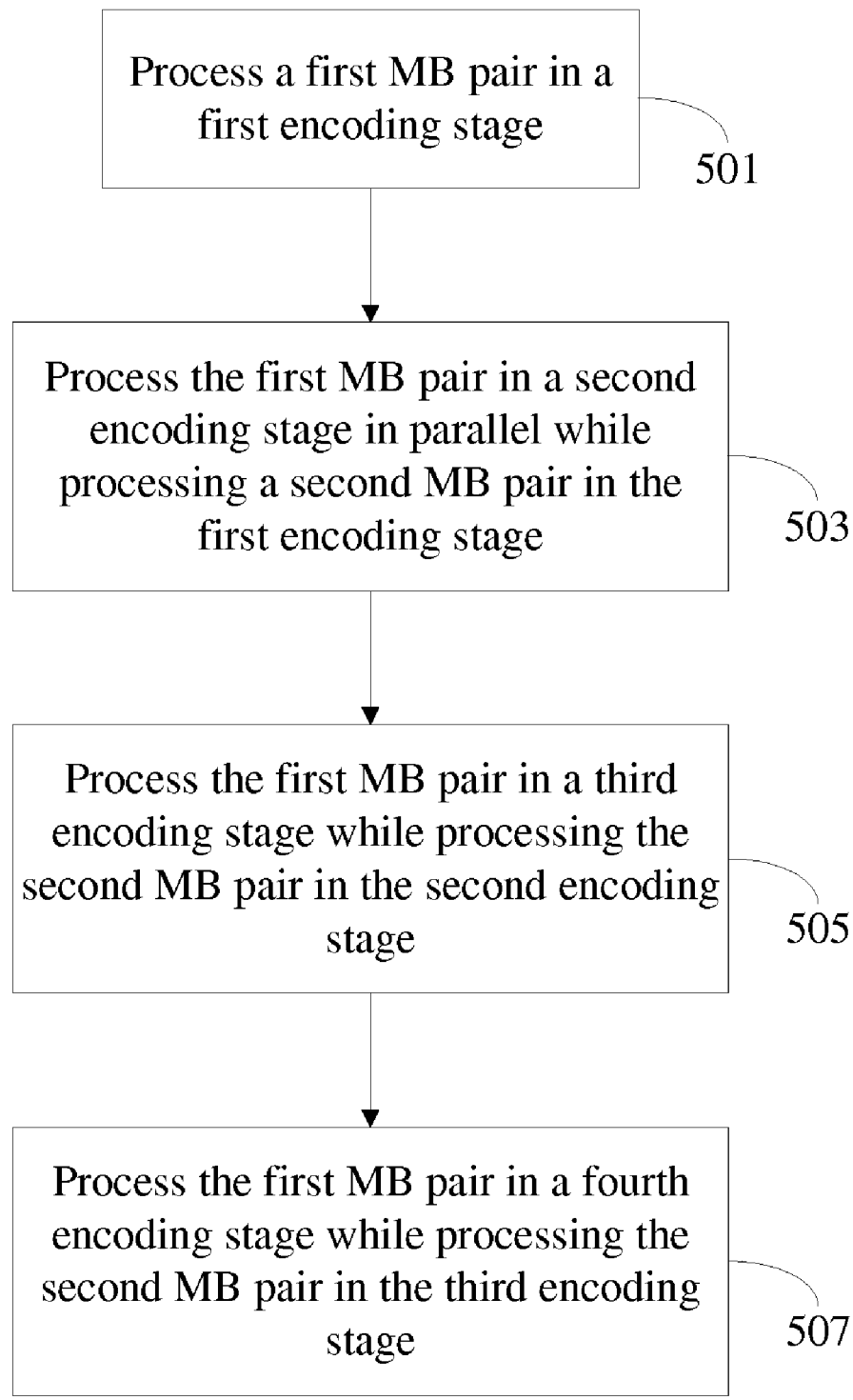
FIG. 5 is a flow chart illustrating another scheduling method for MBAFF coding.

FIG. 5 is a flow chart illustrating an MB pair based pipeline scheduling method for MBAFF coding. In step 501, a first MB pair is processed in a first encoding stage, and in step 503, the first MB pair is processed in a second encoding stage in parallel while processing a second MB pair in the first encoding stage. In step 505, the first MB pair is processed in a third encoding stage while processing the second MB pair in the second encoding stage. In step 507, the first MB pair is processed in a fourth encoding stage while processing the second MB pair in the third encoding stage. In some embodiments of the MB pair based pipeline scheduling method, steps 501, 503, 505, and 507 are performed by one set of processing engines, thus frame coding and field coding processes are executed one by one at each encoding stage. In some other embodiments, these steps are performed by two sets of processing engines, thus at least one encoding stage of the frame coding process is executed concurrently with the corresponding encoding stage of the field coding process.

The MBAFF encoder of the present invention encodes video with adaptive frame and field coding by pipelining, the efficiency of the MBAFF coding can be improved while maintaining the video quality. Moreover, the processing speed is also improved effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An encoder for MBAFF coding, wherein frame coding and field coding processes of MBAFF coding comprise at least two encoding stages respectively, the encoder comprising:
   a first set of processing engines, comprising:
      a first processing engine for executing a first encoding stage of the frame coding process; and
      a second processing engine for obtaining a processed macroblock (MB) pair or a processed frame of a MB pair from the first processing engine, executing a second encoding stage of the frame coding process on the obtained MB pair or frame while the first processing engine executes the first encoding stage of the frame coding process on a subsequent MB pair or frame; and a second set of processing engines, comprising;
   a first processing engine for executing one of the encoding stages of the field coding process on the MB pair or a field of the MB pair in parallel with the corresponding encoding stage executed by one processing engine of the first set of processing engines, and executing a first encoding stage of the field coding process while the first processing engine of the first set executes the first encoding stage of the frame coding process;
   wherein the first processing engine of the second set executes a first encoding stage of the field coding process while the first processing engine of the first set executes the first encoding stage of the frame coding process, and the second processing engine of the first set obtains the processed MB pair or field from the first processing engine of the second set and sequentially executes a second encoding stage of the field coding process on the obtained processed MB pair or field and the second encoding stage of the frame coding process.

2. The encoder as claimed in claim 1, wherein the second set further comprises a second processing engine for obtaining a processed MB pair or field from the first processing engine of the second set, executing a second encoding stage of the field coding process on the obtained MB pair or field while the first processing engine of the second set executes the first encoding stage of the field coding process on a subsequent MB pair or field.

3. The encoder as claimed in claim 1, further comprising a preprocessing engine coupled to the first and second sets of processing engines, for determining an MBAFF coding decision for the MB pair prior to completion of the frame coding and field coding processes, instructing at least an encoding stage of the field coding processed to be skipped when the MBAFF coding decision indicating frame coding, and instructing at least an encoding stage of the frame coding process to be skipped when the MBAFF coding decision indicating field coding.

4. The encoder as claimed in claim 1, wherein the first set of processing engines further comprises:
   a third processing engine for obtaining a processed MB pair or frame from the second processing engine, executing a third encoding stage of the frame coding process on the obtained MB pair or frame while the second processing engine executes the second encoding stage on a subsequent MB or frame obtained from the first processing engine; and
   a fourth processing engine for obtaining a processed MB pair or frame from the third processing engine, executing a fourth encoding stage of frame coding on the obtained MB pair or frame while the third processing engine executes the third encoding stage on a subsequent MB pair or frame obtained from the second processing engine.

5. The encoder as claimed in claim 4, wherein the first processing engine of the first set operates integer motion estimation, the second processing engine operates fractional motion estimation, the third processing engine operates intra prediction and reconstruction, and the fourth processing engine operates Entropy coding and deblocking.

6. The encoder as claimed in claim 5, wherein the second set of processing engines further comprises:
   a second processing engine for obtaining a processed MB pair or field from the first processing engine of the second set, executing a second encoding stage of the field coding process on the obtained MB pair or field while the first processing engine of the second set executes the first encoding stage of the field coding process on a subsequent MB pair or field;
   a third processing engine for obtaining a processed MB pair or field from the second processing engine of the second set, executing a third encoding stage of the field coding process on the obtained MB pair or field while the second processing engine of the second set executes the second encoding stage of the field coding process on a subsequent MB or field; and
   a fourth processing engine for obtaining a processed MB pair or field from the third processing engine of the second set, executing a fourth encoding stage of the field coding process on the obtained MB pair or field while the third processing engine of the second set executes the third encoding stage on a subsequent MB pair or field.

7. The encoder as claimed in claim 6, wherein the first set of processing engines and the second set of processing engines execute the encoding stages of the frame coding and field coding processes in parallel.

\* \* \* \* \*